UNITED STATES PATENT OFFICE.

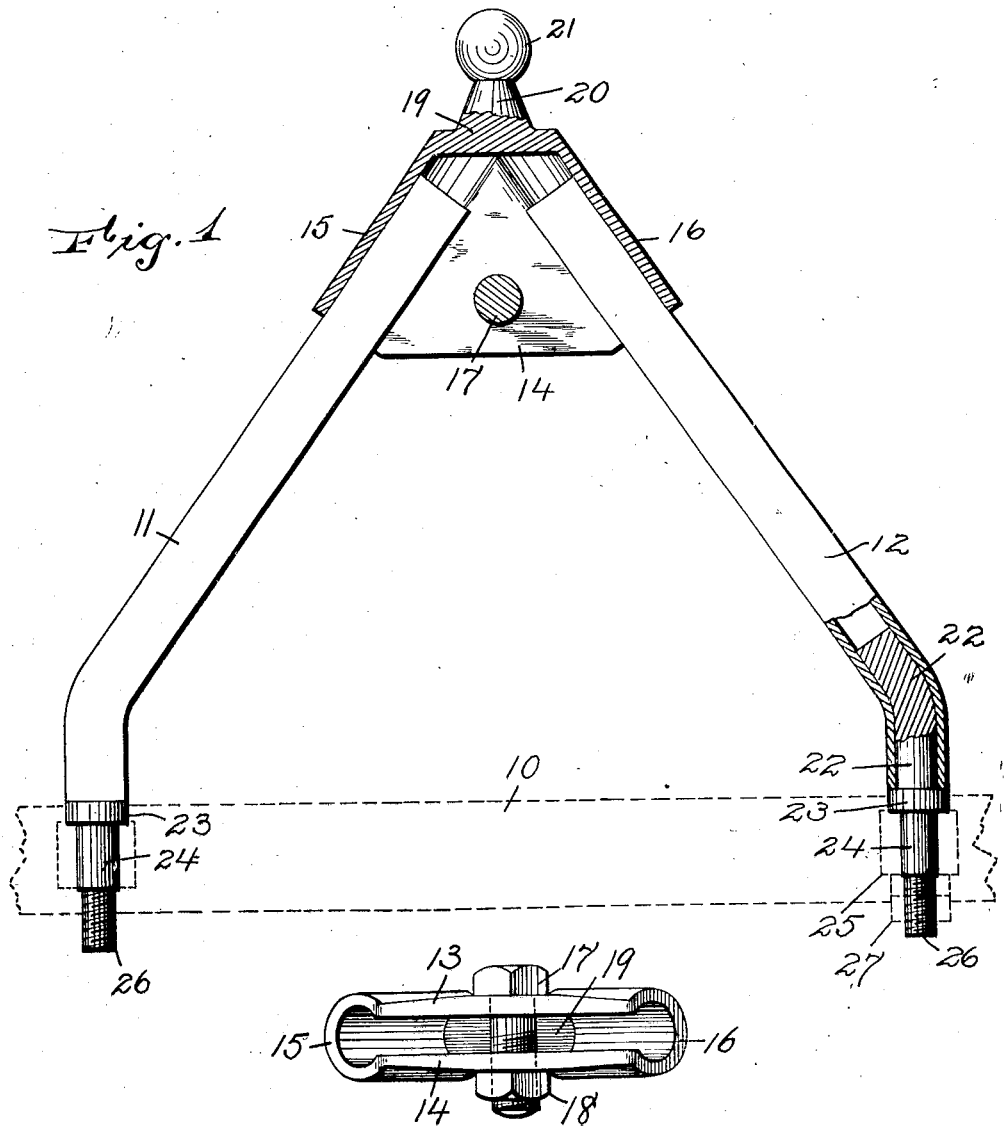

PETER H. SEERY, OF NEWARK, NEW JERSEY.

BRACING-FIXTURE.

1,350,674.   Specification of Letters Patent.   Patented Aug. 24, 1920.

Application filed March 13, 1919. Serial No. 282,363.

*To all whom it may concern:*

Be it known that I, PETER H. SEERY, a citizen of the United States, and a resident of Newark, county of Essex, and State of New Jersey, have invented certain new and useful Improvements in Bracing-Fixtures, of which the following is a specification.

This invention relates to a bracing fixture that is formed of divergent elements and forms, with the braced element, a substantially triangular structure. The invention is particularly designed for use in bracing axles and is illustrated as being applied to the radius rods or bracing rods used in a Ford automobile.

The invention is further designed to securely hold the converging ends of the rods and to also securely attach the divergent ends of the rods, the converging ends of the rods being held by a bracket which can be detached from the rods, therefore making it convenient as a repair bracket, and also permits the easy intentional removal of the rods from the bracket. The divergent ends are secured to the braced element, such as an axle, so as to be tightly secured thereto, and to prevent brazing or welding I have devised a particular form of fastening which is not separable and which does not need brazing or welding.

The invention is illustrated in the accompanying drawing, in which Figure 1 is a top view of the bracing fixture as applied to a Ford automobile, and Fig. 2 is a front view of the bracket without the rods.

In the device shown, 10 illustrates, in dotted lines, the axle of the car which is braced by the two divergent rods 11 and 12. At their converging ends they are secured by a bracket, the casing of which is preferably made of one piece, usually being made of cast steel, and consists of top and bottom walls 13 and 14, respectively, and has the side walls 15 and 16, the side walls 15 and 16 being adapted to receive the rods 11 and 12, and since the illustration shows round rods, the side walls are shown round. The top and bottom walls 13 and 14 are separated by less distance than the diameter of the rods that are received by the bracket, so that these walls are fairly close together.

Means are employed for forcing the top and bottom walls toward each other and holding them in such forced position. In the form shown I use a bolt 17, which passes through the top wall 13 and the bottom wall 14 and is provided with a nut 18. When the ends of the rods are in the bracket and the nut is screwed tight on the bolt, the walls 13 and 14 are forced toward each other and the side walls are drawn inward and have a tendency to firmly grasp the ends of the rods, and the rods are thus held in tight position.

Means for attaching the bracket to a fixture can be made in different forms, but in the form shown I supply the bracket with an end wall 19, a projecting neck 20 and a ball 21, by which it can be fastened to the gear case or other suitable supporting structure of an automobile, as will be evident.

To secure the ends of the rods 11 and 12 to the axle, and to provide a means which is substantially perpendicular to the axle, the ends of the rods are each provided with a bolt 22, which is inserted in the end of the hollow rod and is preferably provided with a collar 23 to form an abutting surface for the end of the rod and to limit the movement of the bolt into the rod. The rod and the bolt are closely joined by having the rod swaged around the bolt, and are then both bent into position, and after being bent they can not be separated unless they are again straightened. The projecting end 24 of the bolt is adapted to fit into a suitable clip, such as the clip 25, and has a threaded reduced end 26 which receives the nut 27 and is securely held in place.

The proportions of the parts can be varied to suit circumstances, but I prefer to localize the clamping action of the device and at the same time to prevent undue bending of the parallel top and bottom walls when pressure is applied to force them toward each other, in the form shown this result being accomplished by making the parallel top and bottom walls thinner where they merge or are connected to the side walls, so that the thickened portion, through which the pressure means or the bolt passes, is more substantial. This causes the thinner portions of the top and bottom walls to respond more quickly to pressure and the binding action takes place while these top and bottom walls maintain their approximately parallel relation.

The device is simply attached and can be easily detached, requires no brazing or welding, and when an extra radius rod in a car is provided, the driver thereof can be sure of the fact that if a radius rod breaks another can be easily inserted.

I claim:

1. A bracing fixture comprising a pair of divergent rods, a bracket adapted to grasp the ends of the rods where they converge, and a bolt fitting in the end of each rod opposite to its converging end, said bolt and rod being bent and adapted to form means for attaching the fixture to a support.

2. A bracing fixture comprising converging rods, a bracket having substantially parallel top and bottom walls and having converging side walls into which the rods fit, a bolt passing through the parallel walls, a nut on the bolt so that the walls can be drawn inward to grasp the rods, and an end wall at the narrow end of the bracket having a projection for securing the bracket to a fixture.

3. In a bracing fixture, a hollow rod, a bolt in the rod, the bolt and rod being bent at the same point, the bolt fitting the rod at the place of bending, whereby longitudinal movement of the two elements relative to each other is prevented.

4. In a bracing fixture, a hollow rod, and a bolt with a collar intermediate of its length, said collar fitting against the end of the rod, the rod and the bolt within the rod being bent at the same point.

In testimony that I claim the foregoing, I have hereto set my hand, this 11th day of March, 1919.

PETER H. SEERY.